UNITED STATES PATENT OFFICE.

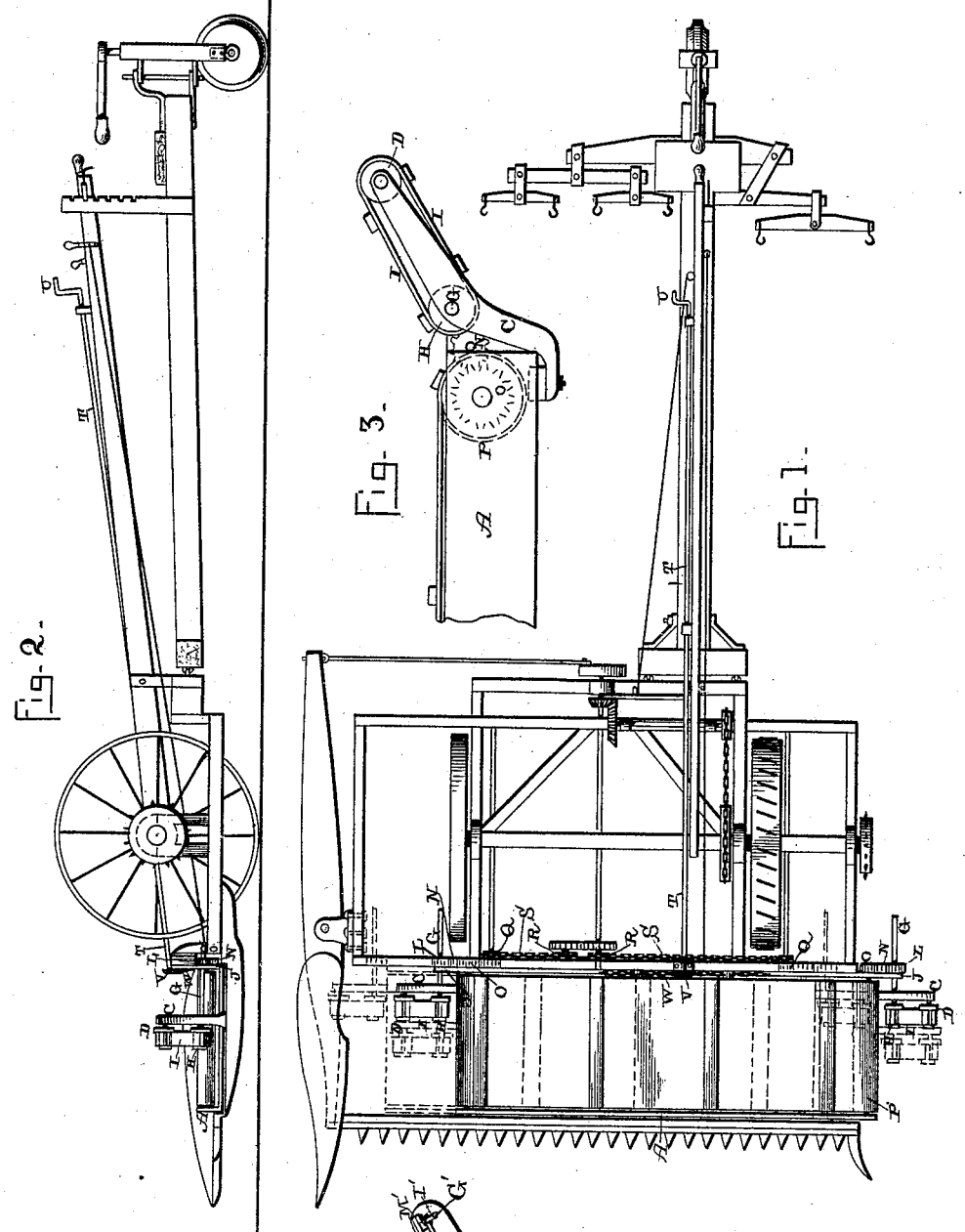

DAVID W. BOVEE, OF TAMA, IOWA.

HARVESTER.

SPECIFICATION forming part of Letters Patent No. 420,376, dated January 28, 1890.

Application filed April 24, 1889. Serial No. 308,376. (No model.)

*To all whom it may concern:*

Be it known that I, DAVID W. BOVEE, of Tama, in the county of Tama and State of Iowa, have invented certain new and useful Improvements in Harvesters; and I do hereby declare the following to be a full, clear, and exact description of the invention, such as will enable others skilled in the art to which it pertains to make and use it, reference being had to the accompanying drawings, which form part of this specification.

My invention relates to an improvement in harvesters; and the objects of my invention are to provide an attachment for one or both ends of the platform of a harvester, so as to cause the cut grain to drop to the ground at a right angle to the line at which the harvester is moving, so that in taking up the grain with a horse-rake or loader the grain lies at an angle to the teeth and enables the rake or loader to take it up cleaner than can be done where the grain is dropped from the harvester in the usual manner; to make the platform movable endwise and to attach to each of its ends a mechanism for turning the grain around as it drops to the ground and to deposit two swaths of the turned grain together, so as to save one-half of the time and labor in gathering the swaths with a horse-rake or loader, and to make the mechanisms at the end of the platform adjustable thereon, so as to adapt them to the length of the grain being cut.

Figure 1 is a plan view of a harvester which embodies my invention. Fig. 2 is a side elevation of the same. Fig. 3 is a detail view. Fig. 4 is a detached view of a modification of the attachment.

A represents the platform of a harvester, and which is made adjustable endwise in its frame in the rear of the cutter, for the purpose of depositing two swaths together, as is fully shown and described in the patent granted to me April 1, 1884, No. 296,120. Nothing new is here claimed in the platform, because this is fully shown in the above-named patent, and because my invention consists only in the mechanisms attached to one or both ends of the platform for turning the cut grain at an angle to the line at which the machine is moving.

Rigidly secured to one or both ends of the platform A, by means of bolts, screws, or other suitable fastenings, are the castings C, which extend outwardly and upwardly from the end of the platform, as shown. These castings extend upwardly and outwardly far enough to allow the butts of the grain which have been deposited on the ground to pass under them as the machine is moving forward. Each casting or support C is laterally adjustable upon its end of the platform, as shown in dotted lines, so as to adjust it to the height of the grain being cut. Journaled in the upper end of each casting is a pulley D, and secured to the endwise-adjustable shaft G, which passes through the casting C at the end of the platform, is a second pulley H, and around these two pulleys D H is passed a narrow endless belt I, which is provided with ribs or cross-pieces upon its surface the same as the carrier of the platform. The shaft G is journaled in the support C and in a bearing J at the inner end of the platform, and placed upon this endwise-movable shaft G next to the platform is a pinion or spur-wheel L, which meshes with an idler N, which is driven by the wheel O on the end of the roller P, which operates the carrier in the usual manner. The wheel O meshes with the driving-wheel Q, which is operated by a driving-wheel R upon the harvester through the medium of the chain or belt S. When the support C is adjusted laterally upon the end of the frame A, as shown in dotted lines, to accommodate the belt I to the height of the grain the shaft G slides through the bearing J and wheel or pinion L. This adjustment is made when the harvester enters the field and the length of the grain desired to be cut is known.

The platform A is moved back and forth upon the frame by means of the operating rod or shaft T, which extends rearward near the driver, and is bent into a crank U. Secured to the inner end of this rod or shaft is a sprocket-wheel V, over which passes the chain W, which has its ends secured to the said platform, whereby, when the shaft is revolved, the platform is moved endwise. Thus it will be seen that the wheels O, upon the rollers P, at each end of the platform, are made to alternately engage the stationary wheels Q, journaled in the frame of the machine, and which receive their motion through the medium of the chains S and driving-wheels R. I here show a movable platform A for the purpose described in my patent herein referred to, and consequently attach the mechanism herein described at each end thereof; but the mechanism is intended and adapted to be attached at one end only of a stationary platform. The shaft G, which extends rearwardly through the wheel L, is high enough to pass over the side of the frame when the grain-platform is shifted, as shown in Fig. 2.

The mechanism above described is adapted to be applied to any harvester where it is desired to deposit the cut grain upon the ground at a right angle to the line at which the harvester is moved. As the grain falls upon the carrier it is moved in the usual manner toward the end of the platform where the stubble ends of the grain drop upon the ground, at the same time that the endless belt I catches the heads and moves them outward. The harvester moving forward at the same time, and the belt I supporting the heads of the grain and moving them outward, causes the cut grain to be deposited upon the ground at a right angle to the line at which the harvester is moving forward.

If the platform is made movable endwise, as here shown, for the purpose of dropping two swaths together, as fully shown and described in the patent referred to, then a mechanism such as has been shown and described is applied to each end of the platform, so that the cut grain will be turned as it is dropped upon the ground at a right angle to the direction in which the harvester is moving. Both of these mechanisms continue in operation during the whole of the time that the harvester is in use; and hence either one may be brought into operation at any time. At each endwise adjustment of the platform the motion of the carrier is reversed and the movement of the endless belt I is reversed at the same time, so that it moves in the same direction as the carrier.

By turning the cut grain at a right angle, as above described, as it drops upon the ground and depositing two swaths together, the cut grain can be taken from the ground cleaner by the rake or loader than where it drops upon the ground in a line with the direction that the harvester is moving, and one-half of the time and labor is saved in raking the grain.

An endless belt I is here shown placed upon the pulleys D H; but, if so preferred, the cam or eccentric motion, as shown in Fig. 4, or any other well-known means for moving the grain, may be substituted for the belt. Any mechanism which will move the heads of the grain outward after the butts have fallen to ground will answer the purpose.

The shifting back and forth of the frame in which the carrier is placed may be accomplished either by means of a lever, as shown in my patent above referred to, or by means of a crank-movement here shown and described, or any other means which may be preferred.

Both of the mechanisms here shown placed at the end of the platform are constantly in motion through the medium of the endless carrier-rollers P, while the machine is in operation; but, if so desired, the one which is not in operation may be thrown out of gear.

Instead of connecting the rollers D H by a belt, as shown in Figs. 1, 2, and 3, for moving the grain outward, the mechanism shown in Fig. 4 may be used. The mechanism shown in this figure consists of the shafts G G', which are provided with the cranks I', and connecting these cranks is the connecting-bar J', which is provided with the teeth L', projecting upward therefrom. Extending outward from the support C are the two bars M', and secured to the upper side of these bars are a suitable number of longitudinal bars N'. As the shafts G G' revolve the connecting-bar J' is carried up and down and forward and backward, thus feeding the beards of the grain which rest upon the bars N' outward. This is a well-known construction in platforms of harvesters for moving the grain outward.

Having thus described my invention, I claim—

1. The combination, with the platform, of an outwardly-extending detachable support secured thereto near its rear edge, two pulleys journaled thereon, one provided with a driving-shaft, and a carrying mechanism connecting the two pulleys and engaging the heads of the grain for supporting and moving them outward, for the purpose described.

2. The combination of the platform, a support C, secured thereto near the rear thereof, the pulleys D H, journaled upon the support, and the endless belt, which is placed around them, with the driving-shaft G, the pinion L, placed upon the shaft, the idler, and the wheel upon a roller which operates the carrier, substantially as described.

3. The combination, with an endwise-moving carrier-platform, the driving-rollers having gear-wheels upon their rear ends, of a driving mechanism, which alternately engages the said wheels, for the purpose described, of a support secured at each end of the platform near the rear thereof, pulleys journaled thereon, one of said pulleys provided with a driving-shaft, an idler engaging therewith, which is driven by the wheel upon the roller, and a belt passing around the pulleys, whereby the said belts are driven in the same direction of the carrier, substantially as specified.

4. The combination of the platform with the adjustable support C, secured thereto at the end near the rear, the pulley D, mounted in the upper end of the support, the pulley H, and the driving-shaft G therefor, the bearing upon the end of the platform for the shaft, the perforated wheel L, through which the shaft G passes, the idler, the wheel O upon the end of the roller at the end of the platform, and the driving-wheel, the shaft G being movable endwise through the wheel L, substantially as specified.

In testimony whereof I affix my signature in presence of two witnesses.

DAVID W. BOVEE.

Witnesses:
E. P. ELLIS,
PHILIP MAURO.